June 6, 1933. A. J. PETERSON 1,912,793
METALLIC PACKING
Filed April 17, 1931 2 Sheets-Sheet 1

INVENTOR.
ARNT J. PETERSON.
BY HIS ATTORNEYS
Williamson & Williamson

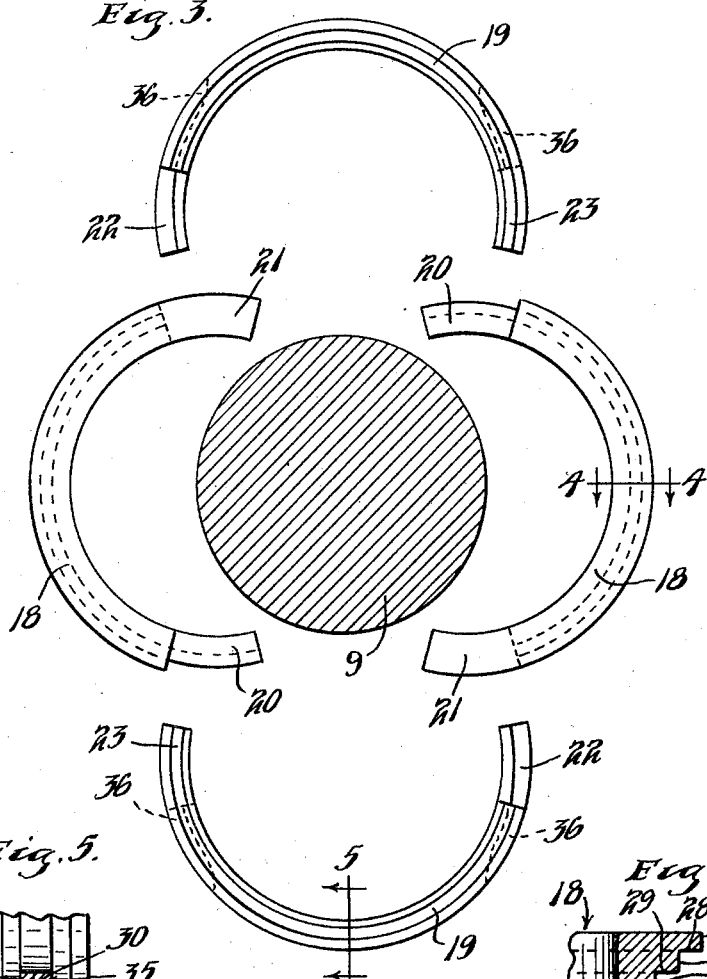

Patented June 6, 1933

1,912,793

UNITED STATES PATENT OFFICE

ARNT J. PETERSON, OF MINNEAPOLIS, MINNESOTA

METALLIC PACKING

Application filed April 17, 1931. Serial No. 530,771.

This invention relates to metallic packing joints for sliding rods such as piston and valve rods and the like.

It is the main object of the invention to provide a novel and improved metallic packing, which can be effectively used to prevent all leakage between a sliding rod and a cylinder head or the like within which the rod works, and which will compensate for wear of the parts to insure a perfect joint at all times.

To these ends, the invention consists in the novel parts and novel combinations of parts hereinafter defined in the claims and described in the following specification, made in connection with the accompanying drawings wherein like reference characters refer to the same or similar parts throughout the various views, and, in which, Fig. 1 is a vertical section taken through a packing joint embodying the present invention, two packing rings being shown and one of the rings being illustrated in section and the other of the rings being illustrated in side elevation with the spring broken away to prevent the obscuring of certain of the parts;

Fig. 3 is a view illustrating a piston rod with the various sections of the packing ring detached from the rod, but in position to be assembled on the rod;

Fig. 4 is a section taken on the line 4—4 of Fig. 3, as indicated by the arrows through one of the sections of the inner ring;

Fig. 5 is a section taken on the line 5—5 of Fig. 3, as indicated by the arrows through one of the sections of the outer ring;

Fig. 6 is a section through one of the assembled packing rings taken on the line 6—6 of Fig. 2, as indicated by the arrows; and Fig. 7 is a view in side elevation illustrating one of the inner rings of the packing ring with the outer ring removed.

Figure 1:
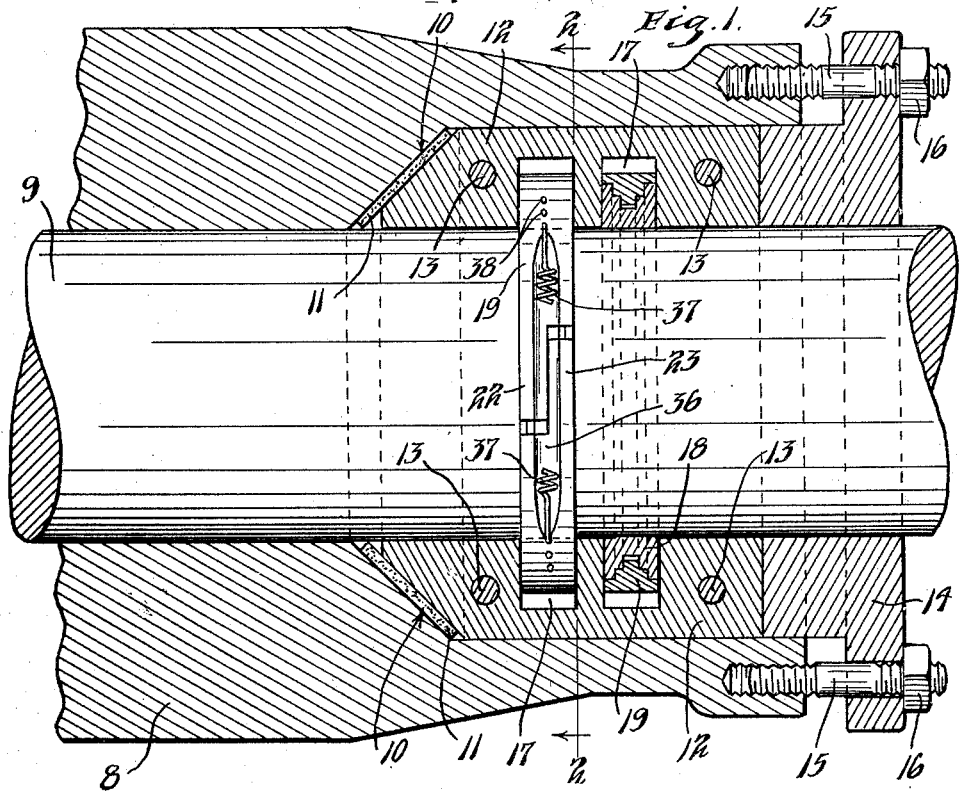

There is illustrated in the drawings a portion of a cylinder head 8 having openings within which a piston rod 9 is mounted for reciprocatory movement. The outer end of the cylinder head 8 has a cylindrical well therein evolved from the central axis of the opening through which the rod 9 projects and the well is of considerably greater diameter than the said opening. The inner end 10 of the well tapers inwardly to the rod opening and a gasket 11 is placed against this tapered inner end 10. A split cylindrical casing 12 fits within the well and embraces the rod 9 and this casing has a tapered inner end which bears against the gasket 11. The casing 12 may be formed in two or more sections releasably connected together by nutted bolts 13, the heads and nuts of which fit within recesses cut in the outer peripheral surfaces of the casing sections. A flanged collar 14 through which the rod 9 extends has a plug portion which fits within the well against the outer end of the casing 12 while studs 15 mounted in the end of the head 8 run through openings in the flange of the collar 14. The casing 12 is forced tightly against gasket 11 by means of nuts 16 screwed onto the outer ends of the studs 15 and bearing against collar 14. With this construction it will be seen that gases cannot escape from the cylinder head between the casing 12 and the sides of the well in the head.

The casing 12 has one or more circumferential grooves 17 cut in its inner peripheral surface and extending transversely to the longitudinal central axis of the rod 9. In the drawings, two grooves 17 are provided and it is within these grooves that the packing rings of the present invention fit. Each packing ring includes a split inner ring composed of two or more inner ring sections 18 and a split outer ring composed of two or more outer ring sections 19. In the drawings, the inner ring is illustrated as being composed of two sections 18, while the outer ring is also shown as being composed of two sections 19. The adjacent ends of both the inner ring sections 18 and the outer ring sections 19 laterally overlap each other and for this purpose one end of each inner ring section 18 is provided with a tongue 20, while the other end is provided with a tongue receiving notched portion 21, as best shown in Fig.

Figure 2:
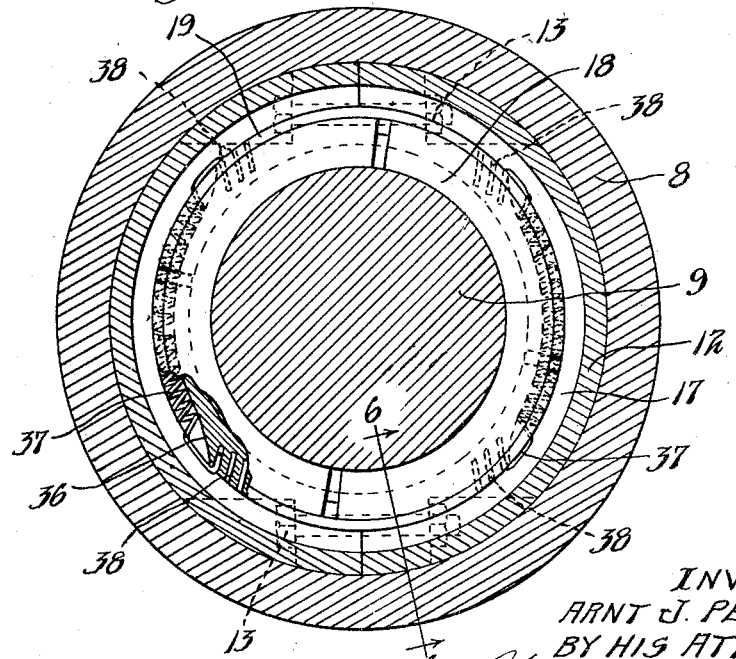
Fig. 2 is a sectional view taken on the line 2—2 of Fig. 1, as indicated by the arrows, certain portions of the packing ring being broken away to more clearly illustrate the construction of the same.

7, and each of the outer ring sections 19 is provided at one end with a tongue 22 forming one section of a half lapped joint while the other end of the outer ring section is provided with another tongue 23 forming an opposing section of a half lapped joint as best shown in Fig. 1. With the construction described, it will be seen that the two inner ring sections 18 may be slidably connected together at their ends, while the two sections 19 of the outer ring may be slidably connected together at their ends. The inner surfaces of the two inner ring sections 18 are formed to closely embrace the rod 9 with slight spacing at the joints between the ends of the two sections as shown in Figs. 2 and 7. A stepped groove 24 is circumferentially cut in the outer periphery of the inner ring formed by the inner ring sections 18. This groove leaves circumferential surfaces 25, 26 and 27 in the inner ring as well as radial surfaces 28 and 29 therein. The surfaces 26 are radially spaced inwardly from the surfaces 25 while the surface 27 is spaced radially inwardly from the surfaces 26. The surfaces 29 are inwardly offset from the surfaces 28, while the surfaces 28 are inwardly offset from the sides of the ring. The outer ring formed by the sections 19 has a stepped flange 30 formed on the inner peripheral surface thereof, and this stepped flange forms the circumferential surfaces 31, 32 and 33 and the radial surfaces 34 and 35. The surfaces 34 are radially spaced inwardly from the outer periphery of the outer ring, the surfaces 35 are radially spaced inwardly from the surfaces 34 and the surface 33 is radially spaced inwardly from the surfaces 32. The surfaces 34 are centrally offset from the sides of the outer ring, while the surfaces 35 are centrally offset from the surfaces 34. The flange 30 of the outer ring is formed to substantially match the groove 24 of the inner ring and the outer ring sections 19 are assembled on the inner ring sections 18 so that the flange 30 fits within the groove 24. The surfaces 35 are preferably made of slightly less radial width than the surfaces 29, while the surfaces 28 are also made of slightly less radial width than the surfaces 34, as best shown in Fig. 6, so that the surfaces 34 will tightly engage the surfaces 28, the surfaces 32 will tightly engage the surfaces 26 and the surfaces 35 will tightly engage the surfaces 29. The two sections 19 are constructed as best illustrated in Figs. 1 and 2, so that when the complete packing ring is assembled, there will be slight spacing between the joining ends of the adjacent sections when the inner surface of the inner ring formed by sections 18 tightly embraces the rod 9. Also the splits between the sections 19 of the outer ring are preferably disposed midway between splits between sections of the inner ring.

Arcuate notches 36 are cut in the outer periphery of the outer ring sections 19 and coiled tension springs 37 are disposed within adjacent notches 36 to extend across adjacent end portions of the sections 19. The springs 37 have hook-like ends and to receive the hook-like ends of the springs, a plurality of circumferentially spaced bores 38 are cut in each section 19 centrally spaced from a notch 36. The hook-like ends of the springs 37 are received within certain of the bores 38, a plurality of bores being provided to permit adjustment of the tension of the springs. The springs 37 exert tension on both the outer and inner ring sections to move these sections radially inwardly toward the longitudinal central axis of the rod 9 and to draw the joining ends of the respective sections closer together.

When the packing rings are assembled in the grooves 17 of the casing 12, it will be practically impossible for gases to leak past the rings. The rings will be made of such a width as to practically fill the grooves 17, but the fit between the sides of the rings and the sides of the grooves will not be so tight as to preclude sliding movement of the packing rings radially of the casing 12. For gases to pass beyond one of the packing rings, it will be necessary that these gases follow a tortuous path from one side of the packing ring between the surfaces 25 and 31, 28 and 34, 26 and 32 and 29 and 35 at one side of the ring to the space between the surfaces 27 and 33 and thence between the surfaces 29 and 35, 26 and 32, 28 and 34 and 25 and 31 to the other side of the ring. As the flange 30 tightly fits within the groove 24, practically no gases can pass beyond one of the packing rings. The springs 37 maintain the outer ring sections 19 tightly pressed against the inner ring sections 18 and the inner ring sections 18 tightly pressed against the rod 9, so that as any of the parts become worn the packing ring adjusts itself to take up for this wear. As the springs 37 are mounted directly on the outer ring sections, pressure will be evenly applied to all portions of the various ring sections even though the longitudinal axial center of the rod 9 does not coincide exactly with the longitudinal axial center of the casing 12.

It will, of course, be understood that as many packing rings as desired may be used in connection with any rod 9 and it will be further understood that the inner and outer rings of each packing ring may be composed of more than two sections 18 and 19, if desired. Of course, changes may be made in the forms, details, arrangement and proportions of the parts without departure from the scope of the present invention.

What is claimed is:—

1. A packing for a sliding rod, comprising a longitudinally split sectional casing adapted to encompass the rod and having a circumferential groove cut in its inner periphery, a packing ring fitting within said groove, said packing ring comprising an inner sectional ring, the sections of which have laterally overlapping ends, the inner ring having a stepped circumferential groove cut in its outer periphery, an outer sectional ring, the sections of which have laterally lapping ends, the outer ring having a circumferential stepped flange formed on its inner peripheral surface, the flange of the outer ring fitting within the groove of the inner ring, and resilient means for urging the ends of adjacent sections of the outer ring toward each other.

2. A packing ring comprising, an inner sectional ring, the sections of which have tongues and tongue receiving notches at their respective ends for joining the sections, said inner ring having a stepped groove cut in its outer periphery, an outer sectional ring, the sections of which have ends forming half lapped joints for securing the sections of the outer ring together, said outer ring having a stepped flange on its inner periphery fitting within the stepped groove of said inner ring and resilient means carried by the sections of said outer ring to draw the sections of both inner and outer rings together.

3. The structure defined in claim 2, said resilient means comprising helical tension springs fitting within grooves cut in the outer periphery of the sections of the outer ring adjacent the ends of said sections, said springs having their ends connected to the sections of the outer ring.

4. The structure defined in claim 2, said resilient means comprising coiled tension springs fitting within grooves cut in the end portions of the sections of the outer ring, said springs having hook-like end portions, the sections of the outer ring having a plurality of small openings within certain of which the hook-like ends of said springs are received.

5. A packing joint for sliding rods and the like, comprising a longitudinally split sectional casing adapted to embrace a rod, means for securing the sections of said casing together, said casing having one or more circumferential grooves cut in its inner periphery, and a packing ring for each groove, said packing ring comprising an inner sectional ring, the sections of which have laterally lapping joining ends, an outer sectional ring, the sections of which have laterally lapping joining ends, the outer periphery of the inner ring and the inner periphery of the outer ring being adapted to engage, one of said peripheries having a stepped circumferential groove cut therein and the other of said peripheries having a circumferential stepped flange formed thereon fitting within said groove and resilient means exerting pressure on said sections of the inner and outer rings to urge the same radially toward the central longitudinal axis of said casing.

6. A packing ring comprising an inner sectional ring of substantially rectangular cross section, the sections of which have laterally overlapping ends, said inner ring being formed on its outer periphery with a double stepped groove extending transversely to the axis of the ring, an outer sectional ring, the sections of which have laterally overlapping ends, said outer ring being formed on its inner periphery with a stepped flange fitting within said groove of the inner ring and extending transversely to the axis of the outer ring, and resilient means urging the ends of adjacent sections of said outer ring toward each other.

In testimony whereof I affix my signature.

ARNT J. PETERSON.